United States Patent [19]

Saito et al.

[11] Patent Number: 4,743,487

[45] Date of Patent: May 10, 1988

[54] MAGNETIC RECORDING MEDIUM

[75] Inventors: Shinji Saito; Chiaki Mizuno; Hiroshi Ogawa; Noburo Hibino; Yasuo Tamai, all of Odawara, Japan

[73] Assignee: Fuji Photo Film Co., Ltd., Japan

[21] Appl. No.: 816,872

[22] Filed: Jan. 7, 1986

[30] Foreign Application Priority Data

Jan. 8, 1985 [JP] Japan ................... 60-1106

[51] Int. Cl.$^4$ .................. G11B 5/70; G11B 5/704
[52] U.S. Cl. ................... 428/141; 427/128; 428/694; 428/900
[58] Field of Search ............. 428/694, 900, 141; 427/128; 360/132

[56] References Cited

U.S. PATENT DOCUMENTS

| 4,316,927 | 2/1982 | Kimura et al. | 428/694 |
| 4,318,957 | 3/1982 | Videc | 428/694 |
| 4,481,231 | 11/1984 | Hashimoto et al. | 427/128 |
| 4,496,626 | 1/1985 | Kasuga et al. | 428/694 |
| 4,505,966 | 3/1985 | Adachi et al. | 428/694 |
| 4,550,049 | 10/1985 | Ono et al. | 428/694 |

Primary Examiner—Paul J. Thibodeau
Attorney, Agent, or Firm—Gerald J. Ferguson, Jr.; Michael P. Hoffman; Michael J. Foycik, Jr.

[57] ABSTRACT

A magnetic recording medium such as an audio cassette tape or a video cassette tape comprising a flexible nonmagnetic support and a magnetic recording layer which contains a ferromagnetic cobalt-containing iron oxide, in which the nonmagnetic support has a surface of a center line average height in the range of 0.01 to 0.1 μm on both sides and the magnetic recording medium has a heat shrinkage ratio of not higher than 1%, the heat shrinkage ratio being determined after allowing to stand at 110° C. for 4 hours.

6 Claims, No Drawings

MAGNETIC RECORDING MEDIUM

BACKGROUND OF THE INVENTION

1. Field of the Invention

The present invention relates to a magnetic recording medium. More particularly, the invention relates to an improvement of a magnetic recording medium such as an audio cassette tape or a video cassette tape comprising a flexible nonmagnetic support and a magnetic recording layer.

2. Description of Prior Arts

Heretofore, most audio cassete tapes have utilized γ-iron oxide as the ferromagnetic material. However, as sound of higher quality has been recently desired, a ferromagnetic cobalt-containing iron oxide showing low noise and giving a sound of wide dynamic range is also employed generally for the audio tapes. Further, the ferromagnetic cobalt-containing iron oxide is employed for the video cassette tapes which are required to show a video image of high quality.

While a magnetic recording medium utilizing the ferromagetic cobalt-containing iron oxide shows favorable properties, said recording medium has a drawback in that the recording medium easily suffers from demagnetization when it is allowed to stand under pressure, whereby decreasing output level of the recorded signals.

Previously, an audio tape or a video tape encased in a cassette has been used or stored under mild ambient conditions with little temperature change such as in a room of a residence. At present, however, the audio tape is sometimes used or stored in an automobile. It is reported that the temperature of inside of an automobile sometimes elevates to a very high level, for instance, up to 104° C. when the automobile is allowed to stand for a certain period of time under exposure of sunlight in a summer season. A video tape is also sometimes carried in an automobile for recording or reproduction. Accordingly, a magnetic recording medium such as an audio cassette tape or a video cassette tape is sometimes placed under severe conditions such as very high temperature. Most of the conventional magnetic recording tapes shrink in the longitudinal direction to show overall curling and/or shrink in the width direction to show partial curling when placed for a long period at a high temperature. Further, the conventional magnetic recording tape wound around a hub sometimes pushes the hub out when allowed to stand at high temperatures, because the wound tape shrinks to tighten the hub greatly. The magnetic recording tape suffering from such deformation shows extreme variation of output in the reproduction mode, and hence no normal reproduction can be done. Further, such deformed tape cannot run smoothly.

The deformation of the magnetic recording tape is more frequently observed with respect to relatively long magnetic recording tapes for playing a long period of time such as audio cassette tapes of C-80, C-90 and C-120 types and video cassette tapes for long time play. In such long magnetic recording tape, the tape is wound over a hub in extremely many folds so as to deform or push the hub out more frequently.

In addition, the ferromagnetic cobalt-containing iron oxide easily undergoes demagnetization under pressure of the shrinkage of the wound tape which has been kept at a very high temperature. Accordingly, a magnetic recording tape using a ferromagnetic cobalt-containing iron oxide is apt to show output decrease of the recorded signals.

SUMMARY OF THE INVENTION

It is an object of the present invention to provide a magnetic recording medium which is improved in the running property and electromagnetic conversion characteristics in the repeated use.

It is another object of the invention is to provide a magnetic recording medium which is higly resistant to deformation when it is allowed to stand at elevated temperatures.

It is a further object of the invention to provide specifically an audio cassette tape showing improved frequency characteristics and widened dynamic range and further showing improved dimensional stability.

There is provided by the present invention a magnetic recording medium comprising a flexible nonmagnetic support and a magnetic recording layer which contains a ferromagnetic cobalt-containing iron oxide and is provided on the support, in which said nonmagnetic support has a surface of a center line average height in the range of 0.01 to 0.1 μm on both sides and said magnetic recording medium has a heat shrinkage ratio of not higher than 1% (preferably not higher than 0.8%).

The heat shrinkage ratio is a value which is determined after allowing the sample to stand at 110° C. for 4 hours. The heat shrinkage ratio means a heat shrinkage ratio which is measured in the direction along which the highest heat shrinkage is given.

Heretofore, a stretched (particularly in the longitudinal direction to enhance the physical strength in said direction) polyester film having increased crystalline structures has been generally employed as the nonmagnetic support of a magnetic recording medium. According to the study of the present inventors, it has been first revealed that the heat shrinkage ratio of the conventional magnetic recording medium (which is determined after allowing it to stand at 110° C. for 4 hours, that is, approx. 1.5–2.3% is relative to the unfavorable behavior of the recording medium at elevated temperatures. Then, their further studies have revealed that the decrease of electromagnetic characteristics, poor running property and deformation of the medium which are frequently observed with respect to a flexible continuous magnetic recording medium such as an audio cassette tape or a video cassette tape kept at elevated temperature can be effectively obviated if the magnetic recording medium utilizes a flexible nonmagnetic support having on both sides a surface of roughness in a specific range and further the heat shrinkage ratio of the medium is adjusted to have a value lower than a specific value.

DETAILED DESCRIPTION OF THE INVENTION

A magnetic recording medium of the present invention comprises a flexible nonmagnetic support and a magnetic recording layer provided on the support.

The flexible nonmagnetic support of the magnetic recording medium of the invention has a surface of a center line average height in the range of 0.01 to 0.1 μm, preferably 0.02 to 0.08 μm, most preferably 0.03 to 0.06 μm, on both sides.

The nonmagnetic support prefeably has a heat shrinkage ratio of not higher than 2%, preferably not higher than 1.5%. The heat shrinkage ratio is a value which is determined after allowing the sample to stand at 110° C. for 4 hours. The heat shrinkage ratio means a heat shrinkage ratio which is measured in the direction along which the highest heat shrinkage is given.

The flexible nonmagnetic support employable for the magnetic recording medium of the invention can be produced by appropriately adjusting the conditions for stretching a plastic film. Particularly preferred is a plastic film such as a polyester film which is in a continuous form, in which Young's modulus thereof in the longitudinal direction (MD) ranges from 450 to 650 kg/mm$^2$, Young's modulus thereof in the width direction (TD) ranges from 400 to 550 kg/mm$^2$, and the difference between these Young's moduli is not higher than 250 kg/mm$^2$. A plastic film for the nonmagnetic support is preferably stretched so as to have the above-mentioned Young's muduli. The stretched film is preferably heat-treated at a temperature of not lower than 110° C. to further reduce the heat shrinkage ratio.

Examples of preferred materials of the nonmagnetic support include polyester films, polycarbonate films, polyamide films, polysulfone films, polypropylene films, and polyethersulfone films. Particularly preferred are polyester films such as polyethylene terephthalate films.

The nonmagnetic support having the aforementioned surface roughness can be prepared, for example, by incorporating particulate particles into the film, or by forming fine particles in the film by producing the particles in situ. Alternatively, a surface of the specific roughness can be formed by appropriately adjusting conditions of the film preparation, and conditions for stretching the film such as the stretching ratio and the stretching temperature.

On the support, a magnetic recording layer comprising a ferromagnetic cobalt-containing iron oxide dispersed in a binder. The magnetic recording layer may contain a variety of additives therein. The reverse surface of the support, namely, the surface on which no magnetic recording layer is provided, may be provided with a backing layer.

The use of the flexible nonmagnetic support having the above-described Young's moduli can give a magnetic recording medium having a heat shrinkage ratio of not higher than 1%.

The ferromagnetic cobalt-containing iron oxide employable in the magnetic recording medium of the present invention preferably contains the cobalt atom in the range of 2 to 6% by weight, and preferably has a particle size in the range of 0.2 to 0.6 μm, an acicular ratio in the range of 1/10 to 1/20, a specific surface area in the range of 20 to 40 m$^2$/g and a coercive force in the range of 500 to 750 Oe.

The ferromagnetic cobalt-containing iron oxide has a coercive force higher than that of the conventionally employed simple iron oxide. Accordingly, the ferromagnetic cobalt-containing iron oxide shows a higher output in the short wavelength region. Therefore, noises can be reduced in a wide ragion through equalization in the course of reproduction. For this reason, the use of the cobalt-containing iron oxide as ferromagnetic material can give a magnetic recording tape showing a wide dynamic range.

There is no specific limitation on the binder employable for the formation of the magnetic recording layer. Examples of the binder include vinyl chloride-vinyl acetate copolymer, vinyl chloride-vinyl acetate-vinyl alcohol copolymer, vinyl chloride-vinyl acetate-maleic acid copolymer, vinyl chloride-vinyl acetate-acrylic acid copolymer, vinyl chloride-vinylidene chloride copolymer, vinyl chloride-acrylonitrile copolymer, ethylene-vinyl acetate copolymer, nitrocellulose resin, acryl resin, polyvinyl acetal resin, and polyvinyl butyral resin. These resins can be employed singly or in combination. Preferred is a combination of the above-mentioned copolymer or resin and a polyurethane resin. An isocyanate type hardener can be employed in conjunction with the coplymers or resins.

The amount of the binder is generally employed in the range of 10 to 100 parts by weight and preferably in the range of 15 to 50 parts by weight per 100 parts by weight of the ferromagnetic material.

As described hereinbefore, the magnetic recording layer can contain other additives. Examples of the additives include abrasives (e.g., α-iron oxide, silicon carbide, and α-alumina), carbon black, dispersing agents (e.g., surfactants) and lubricants (e.g., fatty acids, fatty acid esters, silicone, and fatty alcohols).

The magnetic recording medium of the present invention can be produced by the process comprising the steps of preparing a magnetic paint (or dispersion) containing the ferromagnetic powder, binder and optional additives such as a dispersing agent, lubricant, stabilizer, abrasive and antistatic agent in an organic solvent such as methyl ethyl ketone, cyclohexanone, coating this magnetic paint on the nonmagnetic support, treating the coated paint with an electomagnet to give an appropriate orientation, drying the coated layer, and then applying to the dry layer smoothing treatment such as calendering. Then, the coated layer is allowd to dryness to give a magnetic recording layer. Generally, the magnetic recording layer is formed directly on the nonmagnetic support, but it is also possible to provide an adhesive layer or a subbing layer between the recording layer and the support.

Thus, a magnetic recording medium of the invention comprising a nonmagnetic support and a magnetic recording layer which contains a ferromagnetic cobalt-containing iron oxide and is provided on the support, in which said nonmagnetic support has a surface of a center line average height in the range of 0.01 to 0.1 μm on both sides and said magnetic recording medium has a heat shrinkage ratio of not higher than 1%, the heat shrinkage ratio being determined after allowing to stand at 110° C. for 4 hours can be obtained.

The magnetic recording medium of the invention has the following advantageous features.

(1) The medium shows satisfactory frequency characteristics and a wide dynamic range.

(2) The medium shows reduced physical deformation and satisfactory running property when it is repeatedly employed under mild ambient conditions showing little variation of temperature and humidity such as inside of house or building. This advantageous feature is still observed in the thin magnetic recording media such as audio compact cassette tapes of C-80, C-90 and C-120 types.

(3) The medium is highly resistant to physical deformation thereof and accordingly is improved to reduce the lowering of the output level when it is allowed to stand at temperatures around 100° C.

(4) The medium is so improved as to hardly deform a hub or to hardly make a hub shrink in the case that it is wound over the hub and kept at higher temperatures such as about 100° C. Accordingly, a cassette in which the medium is charged can be easily set in a recording and reproducing device.

(5) The medium is improved to hardly push a hub out in the case that it is wound over the hub and kept at elevated temperatures such as around 100° C. Accordingly, troubles concerning the tape running hardly occur.

(6) Since the medium is hardly deformed when kept at high temperatures such as around 100° C., it shows little trouble such as undesired stop of running.

Examples of the invention and comparison examples are given below. In the following examples and comparison examples, the term "part(s)" means "part(s) by weight", unless otherwise specified.

The measurements of valuous values, properties and characteristics were done in accordance with the following procedures.

(a) Heat shrinkage ratio

A sample is allowed to stand at 23° C., 60% RH and then marks at approx. 10 cm space are placed on the sample. The each space (A) is measured precisely by means of a micrometer. Subsequently, the marked sample is kept at 110° C. for 4 hours under such condition that a tension of 0.4 g/10 mm(width) is applied to the sample. After this treatment is complete, the sample is again placed for 1 hour under the initial conditions and the space of the marks (A') is measured. The heat shrinkage ratio is calculated through the following equation.

$$\text{Heat Shrinkage Ratio} = \frac{A - A'}{A} \times 100\ (\%)$$

(b) Center line average height of support surface

The measurement is done on both surfaces of the support by means of a three-dimensional roughness-measuring apparatus SE-3AK(tradename of Kosaka Lab. Co., Ltd., Japan) at a cut-off value of 0.25 mm.

(c) Tape running property at 23° C. and 60% RH

Sample tapes (40 tapes for one example) are run on 40 commercially available cassette players. The results are classified as follows:.

A: no tape stops during the test, and no disorder in winding is found;

B: no tape stops during the test, but disorder in winding is found for 1-3 players;

C: 1-2 tapes stops during the test, and disorder in winding is found for 4-6 players.

(d) Shrinkage of inner diameter of hub

An inner diameter of a hub is measured under conditions that a sample tape is wound over the hub. The hub with the sample tape therearound is allowed to stand at 110° C. for 4 hours, and then is kept under ambient conditions for 1 hour. The inner diameter is again measured to determine the shrinkage ratio.

(e) Ratio of occurrence of hub push-out

A hub with a sample tape wound therearound is allowed to stand at 110° C. for 4 hours for observing occurrence of pushing-out of the hub. 20 sample tapes are observed for one example.

(f) Ratio of stop of tape-running 20 sample tapes (for one example) are kept at 110° C. for 4 hours. These sample tapes are run on 20 commercially available cassette players (for installation to automobile). The ratio of occurrence of tape-running stop is then determined.

(g) Variation of output level

On a sample tape is recorded a signal of 3 KHz and −10 dB. This sample tape is then wound over a hub and kept at 110° C. for 4 hours. The tape is taken out into ambient conditions and kept for one hour. The signal is then reproduced for determining variation of the output level. 20 tapes are tested for one example. The results are shown by number of tapes which show variation of output level of not less than 6 dB.

(h) Decrease of output level

On a sample tape is recorded a signal of 3 KHz and −10 dB. The recorded singal is then reproduced to determine the reproduced signal output. Subsequently, the sample tape is wound over a hub and kept at 110° C. for 4 hrs. The tape is taken out into ambient conditions and kept for one hour. The signal is then reproduced for determining difference(i.e., decrease) between the initially reproduced signal output and the reproduced signal output after the heat treatment.

(i) Sensitivity

The sensitivity is given as a relative value to the sensitivity of a reference tape at 315 Hz. The reference tape is FR-II (tradename of an audio tape produced by Fuji Photo Film Co., Ltd.). The sensitivity is determined by means of a commercially available apparatus for determination of sensitivty (Nakamichi 582, tradename, available from Nakamichi Co., Ltd., Japan).

(j) Frequency characteristic

The frequency characteristic is given as a difference between an output at 10 KHz and an output at 315 Hz.

(k) Dynamic range (DR)

The dynamic range is given as a difference beteen the maximum output level and a bias noise level.

EXAMPLES 1-6 & COMPARISON EXAMPLES 1-2

| Composition of Magnetic Paint | |
|---|---|
| Ferromagnetic Co-containing iron oxide powder (Hc: 650 Oe, specific surface area: 27 m$^2$/g) | 100 parts |
| Vinyl chloride/vinyl acetate/vinyl alcohol copolymer (copolymerization ratio = 90:3:7) | 20 parts |
| Thermoplastic polyurethane resin (molecular weight: about 50,000) | 5 parts |
| Carbon black | 2 part |
| Oleic acid | 1 part |
| Dimethylpolysiloxane | 0.1 part |
| α-Olefin oxide (number of carbon atoms: 18, molecular weight: about 5,000) | 1 part |
| Butyl acetate | 250 parts |

The magnetic paint was prepared by the process comprising steps of dispersely mixing the above-mentioned components for 48 hours in a ball mill and filtering the resulting mixture over a filter having an average pore diameter of 3 μm.

The magnetic paint was coated on one surface (upper surface) of a polyethylene terephthalate film (thickness: 7 μm, Young's modules in MD direction: 620 kg/mm$^2$, Young's modules in TD direction: 450 kg/mm$^2$) having a heat shrinkage ratio and a surface roughness as indicated in Table 1, using a reverse roll to give a layer having a thickness of 5 μm (dry layer basis). The coated layer was subjected to orientation treatment under a magnetic field of 1,000 gauses while the coated layer was still wet. The coated layer was subsequently dried and treated with a supercalender at a temperature of 70° C. and at a speed of 300 kg/cm). The treated film was then slitted to give a tape of 3.81 mm width. Thus, a Philips type audio cassette tape was prepared. The cassette tape was cut to give a tape of 90 m length which was then encased in an audio compact cassette.

The resulting cassette tape and audio compact cassette encasing the tape therein were subjected to measurements of various properties and characteristics. The results are set forth in Table 1.

TABLE 1

|  | Example |  |  |  |  |  | Comp. Example |  |
|---|---|---|---|---|---|---|---|---|
|  | 1 | 2 | 3 | 4 | 5 | 6 | 1 | 2 |
| Support |  |  |  |  |  |  |  |  |
| Heat shrinkage ratio (%) | 1.02 | 1.02 | 1.03 | 1.04 | 1.03 | 1.02 | 1.04 | 1.03 |
| Surface roughness |  |  |  |  |  |  |  |  |
| Upper side ($\times 10^{-2}$) | 1.1 | 2.4 | 3.3 | 4.5 | 6.0 | 8.0 | 11.2 | 0.8 |
| Lower side ($\times 10^{-2}$) | 1.3 | 2.2 | 3.3 | 4.2 | 5.9 | 7.6 | 11.4 | 0.8 |
| Audio Tape |  |  |  |  |  |  |  |  |
| Heat shrinkage ratio (%) | 0.62 | 0.60 | 0.61 | 0.60 | 0.57 | 0.59 | 0.58 | 0.62 |
| Running property | B | A | A | A | A | A | A | C |
| Shrinkage ratio of hub (%) | 1.7 | 1.5 | 1.6 | 1.6 | 1.6 | 1.5 | 1.7 | 1.5 |
| Ratio of hub push-out (%) | 0 | 0 | 0 | 0 | 0 | 0 | 0 | 0 |
| Ratio of stop of tape running (%) | 0 | 0 | 0 | 0 | 0 | 0 | 0 | 10 |
| Variation of output level | 0 | 0 | 0 | 0 | 0 | 0 | 0 | 0 |
| Decrease of output level | 0.2 | 0.3 | 0.2 | 0.3 | 0.2 | 0.2 | 0.3 | 0.2 |
| Sensitivity | +0.6 | +0.5 | +0.4 | +0.4 | +0.6 | +0.3 | +0.4 | +0.4 |
| Frequency characteristic | +2.8 | +2.5 | +2.5 | +2.3 | +1.9 | +1.7 | +1.1 | +3.0 |
| DR | 54.9 | 55.0 | 55.1 | 54.8 | 54.7 | 54.6 | 54.4 | 55.2 |

As is clear from the above-given results, an audio tape having too rough surface showed extreme decrease of the frequency characteristic (Comparison Example 1) and an audio tape having a surface with too little roughness showed disadvantageous running property and frequently stopped in the running mode (Comparison Example 2).

EXAMPLES 7-13 & COMPARISON EXAMPLE 3

An audio tape was prepared in the same manner as in Examples 1-6 except that the support was replaced with that indicated in Table 2. The resulting tape was cut to give a tape of 90 m length which was then encased in an audio compact cassette.

The resulting cassette tape and audio compact cassette encasing the tape therein were subjected to measurements of various properties and characteristics. The results are set forth in Table 2.

The material of the support was polyethylene terephthalate except that a polycarbonate film was employed for Example 12 and that a polyamide film was employed for Example 13. Young's modules of the support in MD direction was 450 kg/mm² and that in TD direction was 450 kg/mm² except that the support employed for Comparison Example 3 had Young's modules in MD direction of 750 kg/mm² and that in TD direction of 400 kg/mm².

TABLE 2

|  | Example |  |  |  |  |  |  | Com. |
|---|---|---|---|---|---|---|---|---|
|  | 7 | 8 | 9 | 10 | 11 | 12 | 13 | 3 |
| Support |  |  |  |  |  |  |  |  |
| Heat shrinkage ratio (%) | 1.44 | 1.45 | 1.42 | 1.45 | 0.55 | 0.83 | 0.30 | 4.31 |
| Surface roughness |  |  |  |  |  |  |  |  |
| Upper side ($\times 10^{-2}$) | 1.5 | 3.7 | 5.8 | 8.2 | 4.1 | 2.2 | 2.5 | 4.8 |
| Lower side ($\times 10^{-2}$) | 1.5 | 3.5 | 5.9 | 8.0 | 4.0 | 2.2 | 2.6 | 4.5 |
| Audio Tape |  |  |  |  |  |  |  |  |
| Heat shrinkage ratio (%) | 0.90 | 0.91 | 0.90 | 0.85 | 0.30 | 0.20 | 0.17 | 2.15 |
| Running property | B | A | A | A | A | A | A | A |
| Shrinkage ratio of hub (%) | 2.0 | 2.1 | 2.0 | 2.0 | 1.2 | 1.7 | 1.0 | 5.2 |
| Ratio of hub push-out (%) | 0 | 0 | 0 | 0 | 0 | 0 | 0 | 30 |
| Ratio of stop of tape running (%) | 0 | 0 | 0 | 0 | 0 | 0 | 0 | 30 |
| Variation of output level | 0 | 0 | 0 | 0 | 0 | 0 | 0 | 60 |
| Decrease of output level | 0.5 | 0.5 | 0.4 | 0.7 | 0.2 | 0.4 | 0.0 | 3.5 |
| Sensitivity | +0.6 | +0.4 | +0.5 | +0.5 | +0.6 | +0.4 | +0.4 | +0.5 |
| Frequency characteristic | +2.5 | +2.5 | +1.9 | +1.6 | +2.2 | +2.5 | +2.5 | +2.2 |
| DR | 55.1 | 54.8 | 54.7 | 54.5 | 55.2 | 55.1 | 55.0 | 54.7 |

As is clear from the above-given results of Comparison Example 3, an audio tape having a high heat shrinkage ratio showed deformation of hub and pushing-out of hub. Further, it showed disadvantageous running property and frequently stopped in the running mode.

EXAMPLES 14-19 & COMPARISON EXAMPLES 4-5

Audio tapes of Examples 14-19 and Comparison Examples 4-5 were prepared in the same manner as in Examples 1-6 and Comparison Examples 1-2, respectively. The resulting tape was cut to give a tape of not 90 m but 135 m length which was then encased in an audio compact cassette.

The resulting cassette tape and audio compact cassette encasing the tape therein were subjected to measurements of various properties and characteristics. The results are set forth in Table 3.

TABLE 3

|  | Example |  |  |  |  |  | Comp. Example |  |
|---|---|---|---|---|---|---|---|---|
|  | 14 | 15 | 16 | 17 | 18 | 19 | 4 | 5 |
| Support |  |  |  |  |  |  |  |  |
| Heat shrinkage ratio (%) | 0.93 | 0.94 | 0.94 | 0.93 | 0.95 | 0.94 | 0.94 | 0.94 |
| Surface roughness |  |  |  |  |  |  |  |  |
| Upper side ($\times 10^{-2}$) | 1.3 | 2.4 | 3.5 | 4.6 | 5.9 | 8.1 | 11.4 | 0.8 |
| Lower side ($\times 10^{-2}$) | 1.3 | 2.4 | 3.4 | 5.0 | 5.7 | 8.0 | 11.0 | 0.8 |
| Audio Tape |  |  |  |  |  |  |  |  |

TABLE 3-continued

|  | Example | | | | | | Comp. Example | |
|---|---|---|---|---|---|---|---|---|
|  | 14 | 15 | 16 | 17 | 18 | 19 | 4 | 5 |
| Heat shrinkage ratio (%) | 0.53 | 0.53 | 0.53 | 0.54 | 0.53 | 0.54 | 0.54 | 0.54 |
| Running property | B | B | A | A | A | A | A | C |
| Shrinkage ratio of hub (%) | 1.4 | 1.6 | 1.6 | 1.6 | 1.4 | 1.6 | 1.5 | 1.6 |
| Ratio of hub push-out (%) | 0 | 0 | 0 | 0 | 0 | 0 | 0 | 0 |
| Ratio of stop of tape running (%) | 0 | 0 | 0 | 0 | 0 | 0 | 0 | 20 |
| Variation of output level | 0 | 0 | 0 | 0 | 0 | 0 | 0 | 0 |
| Decrease of output level | 0.1 | 0.1 | 0.1 | 0.2 | 0.1 | 0.2 | 0.1 | 0.2 |
| Sensitivity | +0.4 | +0.4 | +0.5 | +0.5 | +0.4 | +0.4 | +0.1 | +0.5 |
| Frequency characteristic | +2.6 | +2.5 | +2.3 | +2.0 | +1.8 | +1.6 | +1.0 | +3.1 |
| DR | 55.8 | 55.7 | 55.3 | 54.9 | 54.3 | 54.3 | 54.0 | 55.9 |

As is clear from the above-given results, an audio tape having too rough surface showed extreme decrease of the frequency characteristic (Comparison Example 4) and an audio tape having a surface with too little roughness showed disadvantageous running property and frequently stopped in the running mode (Comparison Example 5).

EXAMPLES 20–26 & COMPARISON EXAMPLE 6

An audio tape was prepared in the same manner as in Examples 1–6 except that the support was replaced with that indicated in Table 4. The resulting tape was cut to give a tape 135 m length which was then encased in an audio compact cassette.

The resulting cassette tape and audio compact cassette encasing the tape therein were subjected to measurements of various properties and characteristics. The results are set forth in Table 4.

The material of the support was polyethylene terephthalate except that a polycarbonate film was employed for Example 25 and that a polyamide film was employed for Example 26. Young's modules of the support in MD direction was 450 kg/mm² and that in TD direction was 450 kg/mm² except that the support employed for Comparison Example 6 had Young's modules in MD direction of 750 kg/mm² and that in TD direction of 400 kg/mm².

TABLE 4

|  | Example | | | | | | | Com. |
|---|---|---|---|---|---|---|---|---|
|  | 20 | 21 | 22 | 23 | 24 | 25 | 26 | 6 |
| Support | | | | | | | | |
| Heat shrinkage ratio (%) | 1.17 | 1.18 | 1.17 | 1.17 | 0.50 | 0.61 | 0.20 | 3.53 |
| Surface roughness | | | | | | | | |
| Upper side (× 10⁻²) | 1.3 | 3.7 | 6.0 | 8.0 | 4.1 | 2.3 | 2.5 | 4.6 |
| Lower side | 1.4 | 3.4 | 6.0 | 8.1 | 4.0 | 2.2 | 2.6 | 4.5 |

TABLE 4-continued

|  | Example | | | | | | | Com. |
|---|---|---|---|---|---|---|---|---|
|  | 20 | 21 | 22 | 23 | 24 | 25 | 26 | 6 |
| (× 10⁻²) Audio Tape | | | | | | | | |
| Heat shrinkage ratio (%) | 0.74 | 0.75 | 0.76 | 0.76 | 0.24 | 0.40 | 0.10 | 1.90 |
| Running property | B | A | A | A | A | B | B | A |
| Shrinkage ratio of hub (%) | 1.9 | 2.0 | 1.8 | 1.9 | 1.3 | 1.6 | 1.0 | 5.7 |
| Ratio of hub push-out (%) | 0 | 0 | 0 | 0 | 0 | 0 | 0 | 70 |
| Ratio of stop of tape running (%) | 0 | 0 | 0 | 0 | 0 | 0 | 0 | 60 |
| Variation of output level | 0 | 0 | 0 | 0 | 0 | 0 | 0 | 60 |
| Decrease of output level | 0.4 | 0.3 | 0.4 | 0.3 | 0.0 | 0.1 | 0.0 | 2.9 |
| Sensitivity | +0.5 | +0.4 | +0.4 | +0.3 | +0.5 | +0.4 | +0.4 | +0.4 |
| Frequency characteristic | +2.4 | +2.3 | +1.8 | +1.5 | +2.0 | +2.4 | +2.4 | +2.0 |
| DR | 54.4 | 55.3 | 54.8 | 54.6 | 55.0 | 55.9 | 55.3 | 55.0 |

As is clear from the above-given results of Comparison Example 6, an audio tape having a high heat shrinkage ratio showed deformation of hub and pushing-out of hub. Further, it showed disadvantageous running property and frequently stopped in the running mode.

We claim:

1. A magnetic recording medium comprising a flexible nonmagnetic support and a magnetic recording layer which contains a ferromagnetic cobalt-containing iron oxide and is provided on the support, in which said nonmagnetic support has a heat shrinkage ratio of not higher than 1.5% and a surface of a center line average height in the range of 0.01 to 0.1 $\mu$m on both sides and said magnetic recording medium has a heat shrinkage ratio of not higher than 1%, the heat shrinkage ratio being determined after allowing to stand at 110° C. for four hours.

2. The magnetic recording medium as claimed in claim 1, wherein said nonmagnetic support is in a continuous form, a Young's modulus thereof in the longitudinal direction ranges from 450 to 650 kg/mm², a Young's modulus thereof in the width direction ranges from 400 to 550 kg/mm², and the difference between these Young's moduli is not higher than 250 kg/mm².

3. The magnetic recording medium as claimed in claim 1, wherein said nonmagnetic support is made from a resin selected from the group consisting of polyester, polycarbonate and polyamide.

4. The magnetic recording medium as claimed in claim 1, wherein said heat shrinkage ratio of the recording medium is not higher than 0.8%.

5. The magnetic recording medium as claimed in claim 1, wherein said center line average height of the surface of the nonmagnetic support ranges 0.02 to 0.08 $\mu$m on both sides.

6. The magnetic recording medium as claimed in claim 1, wherein said recording medium is in the form of an audio cassette tape.

* * * * *